Jan. 10, 1967  H. BECK  3,297,055
HOSES OF SYNTHETIC PLASTIC MATERIAL
Filed Oct. 2, 1963
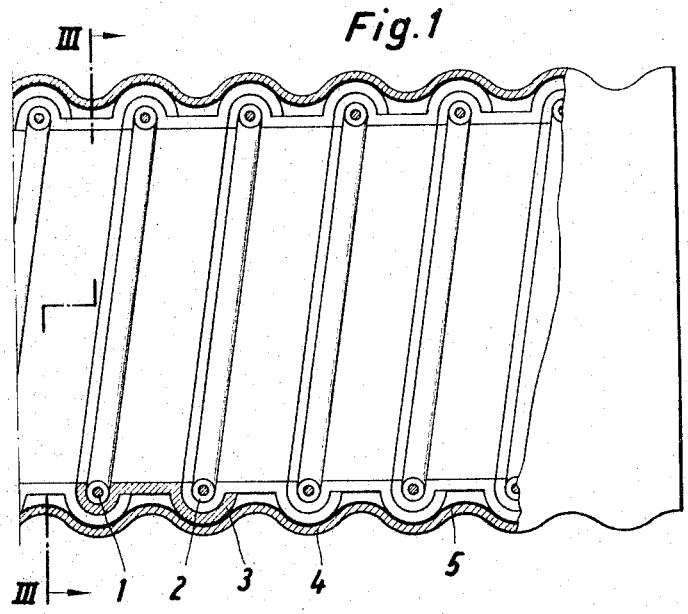
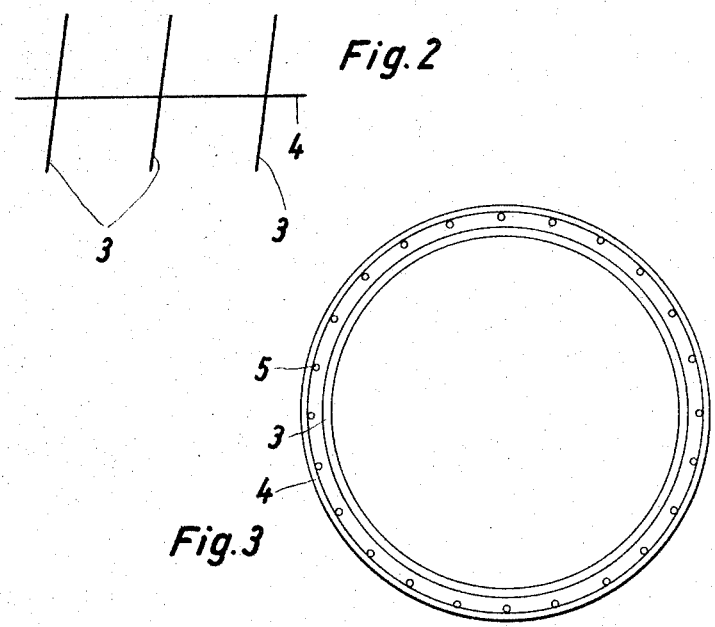
Inventor:
HEINZ BECK
By Hane and Nydick
Attorneys

United States Patent Office 3,297,055
Patented Jan. 10, 1967

3,297,055
HOSES OF SYNTHETIC PLASTIC MATERIAL
Heinz Beck, Langen, near Frankfurt am Main, Germany, assignor to Techno-Chemie Kessler & Co. G.m.b.H., Frankfurt am Main, Germany, a firm
Filed Oct. 2, 1963, Ser. No. 313,328
Claims priority, application Austria, Oct. 10, 1962,
A 7,999/62; Germany, July 6, 1963, T 24,243
9 Claims. (Cl. 138—122)

The invention relates to hoses of synthetic plastic material.

Hoses of synthetic plastic material, for example polyvinyl-chloride, are being increasingly used in connection with vacuum cleaners. Such hoses have been proposed which comprise a helical spring as internal support, this being of hard synthetic plastic material or of metal or of metal which is sheathed in synthetic plastic material. In accordance with a previously proposed method, this spring is surrounded by or sheathed in a profiled synthetic plastic member or plain strip so that the marginal regions of the profiled member or strip overlap. The overlapping regions are then welded or cemented. The spring thus lies seated in a passage which runs within the profiled member or the strip and when the spring is of synthetic plastic material or is sheathed in such material, is united by welding or cementing with the member forming the hose. Due to the welding or cementing at the overlapping regions, a closed hose is produced which is protected by the helical spring from collapsed due to mechanical forces or due to the vacuum conditions under which such a hose is used.

The profiled or plain strips from which the hoses are formed are made by extrusion, the molecular chains lying in the extrusion direction.

As is known, synthetic plastic materials have their greatest strength and resistance to fatigue, in the extrusion direction. When winding the strips into the form of a hose, the molecular chains run radially relative to the axis of the hose.

When bending or pulling the hose, the hose is stressed perpendicularly to the direction of the molecular chains, the result being that the hose can readily be torn.

The present invention consists in a hose comprising a supporting helix of metal, synthetic plastic material or metal sheathed in such material, about which a strip having a cross section in the form of two curved marginal portions of unequal radii interconnected by a web is disposed helically with the supporting-helix convolutions seated in a channel formed in the marginal portion of smaller radius and with the said smaller radius marginal portion seated in overlapped engagement with the marginal portion of larger radius, the tubular formation formed by the strip being covered by an external tube of synthetic plastic material which lies in engagement with the said tubular formation and has an undulatory form the troughs of which extend into the spaces between the successive larger-radius marginal portions of the said tubular formation, the course of the molecular chains of the material of said tubular formation extending approximately transversely to the axial direction of the hose, and the course of the molecular chains of the external tube being generally parallel.

The external tube may be a tube of such nature as to be expansible over the said tubular formation by the action of compressed air, for fitting the tube to said tubular formation. Alternatively, the external tube may be a tube extruded onto the said tubular formation. Again, the external tube may be an initially heat shrinkable tube fitted to the tubular formation by the action of heat.

In order not to reduce the flexibility of the hose, the external tube should not have a greater wall thickness than 0.5 mm. Furthermore, the pitch of the helical supporting spring should be as large as possible so that the wound hose has only a slightly undulatory form or large pitch, whereby the external tube can lie thereagainst with shallow undulations.

The molecular chains of the external tube run parallel to the axis of the hose, whereas the molecular chains of the strip forming the hose run approximately transversely to the axis of the hose, so that an increased strength is given in both directions.

It has been proposed to make hoses of synthetic plastic material by drawing a synthetic plastic tube onto a supporting helix of metal, which may be sheathed in synthetic plastic material, and welding the helix to the tube, a second helix being wound into the spaces between the convolutions of the first helix and then covered by a further tube. This multiple-helix arrangement provides a strong hose but does not provide sufficient flexibility and resistance to fatigue.

Especially in connection with vacuum cleaners, the most active stresses are tensional stresses acting in the axial direction of the hose, either as a result of direct pulling on the hose or as a result of bending.

A further improvement in strength and flexibility may be achieved if threads or wires of metal, synthetic plastic material, textile material or the like are provided between the tubular formation and the external tube, the threads or wires being radially distributed about the periphery of the hose and following an undulatory course in the axial direction of the hose by engagement with the external tube. By this means the resistance to tension in the axial direction can be increased without impairing the flexibility of hose.

Hoses have been proposed in which, for improving the resistance to tension in the axial direction, wires or textile threads extending parallel to the axis of the hose are embedded in the surface of the hose. These hoses have the disadvantage that they are of reduced flexibility, this being due to the axial disposition of the wires or threads. The radially distributed threads or wires in the hose of the invention do not reduce the flexibility of the hose since the said threads or wires follow an undulatory course in the axial direction of the hose. Only when, by bending the hose, some of these threads or wires are straightened out over part of their length, do they provide resistance to tensional stress, this being precisely when such resistance is needed.

If a hose as abovedefined, in which the molecular chains of the external tube run parallel to the hose axis and the molecular chains of the profiled strips run approximately transversely to the hose axis, is stretched, then a critical point is reached if the hose is stretched so far that the connection regions between the crests of the hose become straight. Stretching beyond this point results in breakage of the hose wall. The inserted wires or textile threads can be given such a length that they are fully straightened when this point is reached, and thus prevent overstretching of the hose.

In order to make the invention clearly understood, reference will now be made to the accompanying drawings which are given by way of example and in which:

FIG. 1 is an elevation view, partly in longitudinal section, of a portion of hose having inner and outer parts;

FIG. 2 is a diagram illustrating the directions in which the molecular chains for the said hose parts extend; and FIG. 3 is a sectional view along the line III—III of FIG. 1.

The hose comprises a wire 1 which has an extruded synthetic plastic sheathing 2 and which is wound into a helical shape so as to form a helical supporting member.

The helical supporting member can alternatively be made entirely of a suitable synthetic plastic material.

The profiled strip 3 is then placed over the helix 1, 2 in such manner that the convolutions of the helix 1, 2 lie in a shallow channel in the strip 3. The strip 3 has curved formations of two different radii at its marginal regions, such that when the strip 3 is wound helically on the helix 1, 2, the margined region which has the curved formation of larger radius engages over the marginal region which has the curved formation of smaller radius. The helix 1, 2 is connected to the profiled strip 3 by welding or cementing and likewise the interengaged curved formations of the strip 3 are connected together.

The resultant hose is covered by a tube 4 of synthetic plastic material, either by expanding the tube thereover by means of compressed air or by extruding the tube 4 by means of a transverse extrusion head in an extrusion machine. Alternatively a heat-shrinkable tube may be used.

When fitting the tube 4 by expansion, the tube 4 should initially have an inner diameter smaller than the outer diameter of the hose formed by the strip 3. The tube 4 is then placed end to end with the hose formed by the strip 3 and is expanded by means of compressed air. Thereafter, the tube 4 is drawn over the hose formed by the strip 3, while in the expanded condition. After the compressed air is shut off, the expanded tube 4 contracts to its original size and lies in an undulating shape against the strip 3.

When providing the tube 4 by extrusion, the hose formed by the strip 3 is passed into a transverse extrusion head of an extrusion machine and is drawn in its axial direction therethrough, the extrusion machine being operated in such manner that the tube 4 is extruded onto the hose at the same speed as the passage of the hose, the extruded tube 4 forming itself into an undulating shape between the successive convolutions of the strip 3.

If a heat-shrinkable tube is used as the tube 4, then its internal diameter is initially greater than the external diameter of the hose formed by the strip 3, it being thus readily possible to draw the tube 4 onto the hose. Thereafter, by the action of heat, the tube 4 is contracted so as to lie tightly against the hose, with portions extending in an undulating manner between successive convolutions of the strip 3.

The courses of the molecular chains of the hose of FIG. 1 are shown in FIG. 2. The molecular chains of the strip 3 run approximately transversely to the axial direction of the hose, whereas the molecular chains of the external tube 4 run parallel to the axis of the hose.

Wires or threads 5 are provided in the hose, between the tube 4 and the strip 3, these running in the axial direction of the hose but following the undulations of the tube 4. From FIG. 3 it can be seen that the wires or threads 5 are distributed radially around the periphery of the hose, the number of wires or threads 5 used, or their strength, depending on the magnitude of the tensional loads expected.

Preferably, the tube 4 is of transparent synthetic plastic material and the threads 5 are of a different colour to the colour of the strip 3, so that the threads 5 can readily be inspected.

The threads 5 may be of the same material as the strip 3 and tube 4 or may be covered with such material by extrusion. It can thereby achieved that the threads 5 are secured to the tube 4 during extrusion of the tube 4 and while the tube 4 is still uncured, this increasing the tension resistant action of the threads 5.

Having now particularly described my invention what I desire to secure by Letters Patent of the United States and what I claim is:

1. A hose comprising, in combination, a support helix formed of a spirally wound strand of resilient material; a strip having a cross-section in the form of two curved marginal portions of unequal radii joined by a web, said strip being wound helically about the turns of the support helix and being seated in a channel formed in the marginal strip portion of smaller radius and with said smaller radius marginal strip portion seated in overlapped engagement with the marginal strip portion of larger radius to form a tubular body having an outer corrugated configuration; and a tube made of synthetic plastic material externally encompassing said tubular body in pressure engagement therewith, said external tube having a corrugated configuration the valleys of which are located in the spaces between successive marginal strip portions of the larger radius, the molecular chains of the strip material forming said tubular body being oriented in a direction approximately transversely to the axial direction of the hose and the molecular chains of the material of said external tube being oriented in a direction substantially parallel to the axial direction of the hose.

2. A hose according to claim 1 wherein said external tube is a tube made of a pressure expandable material.

3. A hose according to claim 1 wherein said external tube is made of a heat shrinkable material for fitting the external tube upon the tubular body by the action of heat.

4. A hose according to claim 1 and comprising resilient strands interposed between said tubular body and said external tube lengthwise therewith and in circumferentially spaced relationship, said strands having a wavy configuration matching the corrugations of said tubular body and said external tube.

5. A hose according to claim 4 wherein said external tube is made of a transparent material and said threads have a color different from the color of the strip forming said tubular body.

6. A hose according to claim 4 wherein said strands are made of the same material as that of the strip.

7. A hose according to claim 4 wherein said strands are made of the same material as the external tube.

8. A hose according to claim 4 wherein said strands are sheathed with the same material as the material of the strip.

9. A hose according to claim 4 wherein said strands are sheathed with the same material as the material of said external tube.

References Cited by the Examiner

UNITED STATES PATENTS

| | | | |
|---|---|---|---|
| 2,941,571 | 6/1960 | Rothermel | 138—122 X |
| 2,968,321 | 1/1961 | Kahn | 138—122 |
| 2,995,151 | 8/1961 | Lockwood | 138—122 |

FOREIGN PATENTS

| | | |
|---|---|---|
| 751,621 | 5/1953 | Germany. |
| 887,093 | 1/1962 | Great Britain. |

LAVERNE D. GEIGER, *Primary Examiner.*

C. HOUCK, *Assistant Examiner.*